United States Patent [19]

Spiegler

[11] 4,231,865

[45] Nov. 4, 1980

[54] BACKWASHING REVERSE-OSMOSIS AND ULTRAFILTRATION MEMBRANES BY ELECTRO-OSMOSIS

[75] Inventor: Kurt S. Spiegler, El Ceritto, Calif.

[73] Assignee: The United States of America as represented by the Secretary of the Interior, Washington, D.C.

[21] Appl. No.: 64,466

[22] Filed: Aug. 7, 1979

Related U.S. Application Data

[63] Continuation of Ser. No. 950,761, Oct. 12, 1978, abandoned.

[51] Int. Cl.³ .................. B01D 13/00; B01D 13/02; C02B 1/82
[52] U.S. Cl. ............................. 210/636; 210/655; 204/180 R
[58] Field of Search .................. 204/180 P, 180 R; 210/22, 23 H, 79, 81, 82, 19, 23 F, 35, 108, 222, 243, 333 R, 411, 416 M, 427, 433 M

[56] References Cited

U.S. PATENT DOCUMENTS

| | | | |
|---|---|---|---|
| 2,741,595 | 4/1956 | Juda | 204/301 |
| 3,392,100 | 7/1968 | Kollsman | 204/180 P |
| 3,453,201 | 7/1969 | Mihara et al. | 204/301 |
| 3,657,106 | 4/1972 | Smith | 204/301 |
| 3,697,410 | 10/1972 | Johnson et al. | 204/180 P |
| 3,827,976 | 8/1974 | Stana et al. | 210/23 H |
| 3,850,797 | 11/1974 | Lyall | 210/23 H |
| 3,853,756 | 12/1974 | Stana | 210/23 |
| 3,870,613 | 3/1975 | Nakamura et al. | 204/180 P |
| 3,940,336 | 2/1976 | Macevicz et al. | 210/81 |

FOREIGN PATENT DOCUMENTS

| | | | |
|---|---|---|---|
| 5149180 | 4/1976 | Japan | 210/23 H |
| 5163375 | 6/1976 | Japan | 210/23 H |

OTHER PUBLICATIONS

Millipore Catalogue and Purchasing Guide, Copyright 1977, Millipore Corp., Bedford, Mass., p. 48.

*Primary Examiner*—Charles N. Hart
*Assistant Examiner*—David R. Sadowski
*Attorney, Agent, or Firm*—William S. Brown; Donald A. Gardiner

[57] ABSTRACT

Improved efficiency of reverse-osmosis and ultrafiltration processes is achieved by backwashing membranes by means of electroosmosis. This is achieved by application of an electric potential across the membrane, thereby causing a backflow of water through the membrane.

3 Claims, 1 Drawing Figure

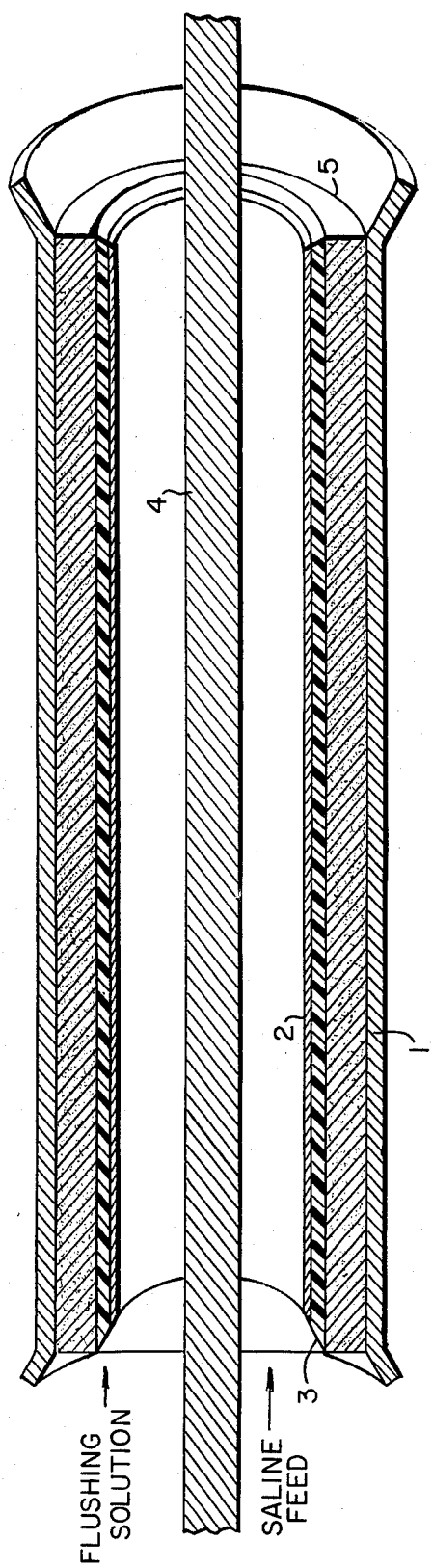

BACKWASHING REVERSE-OSMOSIS AND ULTRAFILTRATION MEMBRANES BY ELECTRO-OSMOSIS

This is a continuation of application Ser. No. 950,761, filed Oct. 12, 1978, now abandoned.

Membrane processes are commonly limited by reduced efficiency of the membranes resulting from compaction, and from deposition of films and crusts of insoluble materials on the surface of the membrane. Compaction is generally unaffected by mechanical or chemical cleaning of the membrane, and such prior art techniques have generally been found to have severe efficiency limitations for removal of deposits. In addition, many of the prior art methods have resulted in damage to the membranes. Also, backflushing under pressure has generally not been found to be feasible since damage to the membranes commonly results from this type of procedure as well.

It has now been found, according to the process of the invention, that the efficiency of a membrane used in a pressure-driven process, such as reverse osmosis or ultrafiltration, may be substantially restored by backwashing the membrane by means of a process of electroosmosis. This process involves application of an electric potential across the membrane in order to cause a flow of water in the reverse direction from that of the pressure-driven process.

Reference is made to the FIGURE which illustrates diagrammatically a cross-section of an embodiment of an apparatus to which the process of the invention is applicable.

The apparatus illustrated by the FIGURE comprises a conventional tubular reverse-osmosis cell utilizing axial flow of the feed solution. The cell consists of a support tube 1, membrane 2 and membrane support 3. In accordance with the invention, the apparatus is additionally provided with an inner electrode 4 and outer cylindrical electrode 5 which serve to provide the required potential difference across the membrane.

The support tube is conventional and commonly consists of copper, stainless steel or similar inert, durable, and economical material. Optimum form and dimensions of the tube, and resultant cell, may vary widely according to the specific feed solution, type of membrane employed, etc., as will be apparent to those skilled in the art. The membrane is also conventional and may consist of any of a wide variety of membranes employed in pressure-driven membrane processes. However, the invention has been found to be particularly effective in the case of cellulose-acetate membranes, which may also vary considerably depending on acetate content as well as physical properties resulting from specific methods employed in their preparation. Generally such membranes will have an acetyl content of about 34 to 43 percent, a thickness of about 0.05 to 0.2 millimeters, and water content of about 10 to 45 percent. Curing by means of annealing in warm water at a temperature of about 80° to 95° C. has also been found desirable in providing membranes that give optimum results when treated according to the process of the invention.

Materials suitable for use as the membrane support are also well known and consist of materials that are sufficiently porous to permit adequate flow of product water, as well as any flushing solutions that may be employed, while simultaneously providing adequate support for the membrane. An effective support material comprises a porous Nylon parchment which, in turn, is supported by a liner such as filter paper.

Copper and silver electrodes have been found to be generally most efficient and economical. However, other electrode materials such as graphite, stainless steel and other electric conductors may be suitable for specific applications. The outer electrode will generally be of a cylindrical form and of dimensions suitable for fitting flush with the inside of the support tube. The inner electrode will generally consist simply of a rod, although a hollow-tube construction may be suitable for some applications. The electrodes can also be in the form of electrically conducting sheets incorporated in spiral-wound modules. Optimum dimensions of the electrodes will vary greatly with the strength of the desired electrical potential, size and shape of the cell, fluid flow rates, etc., and are best determined experimentally.

Reverse osmosis processes, to which the process of the invention is applicable, are well known in the field of purification of saline water. In such processes, a pressure in excess of the osmotic pressure of the saline water feed solution is applied to the feed solution separated from purified water by a semipermeable membrane. Pure water is thereby caused to permeate through the membrane to the low-pressure side the membrane, while the salt molecules or other impurities are retained by the membrane. As discussed above, however, efficiency of the process is often greatly reduced by compaction and deposition of impurities on the high pressure (feed solution) side of the membrane. Therefore, according to the process of the invention, the membrane is back-washed by application of an electric potential across the membrane to cause a flow of water through the membrane in a direction opposite that of the pressure-driven process. This passage of current can be performed while the pressure-driven process is interrupted, or during the process itself.

If the reverse-osmosis process is periodically interrupted for backwashing, the frequency, as well as the magnitude of the backwashing will depend on the type of membrane, extent of compaction or fouling of the membrane, specific solutions involved, etc., and optimum values will again be best determined experimentally. Generally, however, a flux of backwashing volume of about 0.006 milliliters per square centimeter per minute for a period of about 30 seconds to 40 minutes is sufficient to restore at least a substantial portion of the original efficiency of the membrane. The necessary flow rate of the backwashing solution is achieved by application of an electric potential between the electrodes that is sufficient to cause electroosmotic flow of liquid from the low-pressure to the high-pressure side of the membrane. The magnitude of this potential will also vary with the type of membrane, specific solutions employed, and configuration and spacing of the electrodes. However, a d.c. potential of about 2 to 20 volt, with a resulting current density of about 10 to 100 milliamp per square centimeter, will generally provide a solution flow rate sufficient to achieve the desired improvement in efficiency of the membrane. As a rule, particularly when employing cellulose-acetate membranes, the outer cylindrical electrode will serve as the anode, with the inner electrode constituting the cathode. However, with certain combinations of membranes and solutions, reversal of polarity of the electrodes may be required to achieve the desired flow of liquid in a direction opposite that occurring in the reverse-osmosis process.

It has also been found that the efficiency of the backwashing process of the invention may be still further enhanced by application of a flushing solution to the low-pressure side of the membrane during the backwashing process where the strength of the membrane is sufficient to permit such a procedure. The flushing fluid may consist essentially of water, or it may additionally contain salts or other additives to change the osmotic-pressure difference across the membrane, and to modify the electrode-reaction products. The flushing solution may be passed through the membrane support on the low-pressure side of the membrane. In addition, the high-pressure side may be flushed also so as to enhance the restoration of the original membrane flux and salt-rejection properties. Suitable flow rates and pressures of the flushing solutions may vary considerably with size and configuration of the reverse-osmosis cell, specific nature of the membrane and the membrane support, composition of the flushing solution, etc. For the high pressure flushing solution, superficial velocities varying between 100 and 200 milliliters per minute will generally be sufficient for one-inch diameter membrane tubes, while volume rates on the low-pressure side of one-inch membrane tubes can vary over a wide range, e.g., from about 0.006 to 4 milliliters per minute. Some degree of backwashing, and resultant improved efficiency of the membrane, is achieved by application of an appropriate flushing solution alone, i.e., without application of the electric potential across the membrane. This results from osmotic water flow through the membrane in the direction opposite that of the reverse-osmosis process. However, the additional electroosmotic flow of water resulting from application of the electric potential has been found to result in a substantial improvement in restoration of efficiency of the reverse-osmosis membrane as compared to osmotic flow.

The process of the invention will be more specifically illustrated by the following example.

EXAMPLE

In this example, using a reverse osmosis cell of the type described above, a cylindrical section of a used cellulose-acetate membrane cured at 94° C. was flushed on the inside and the outside with a solution of common salt containing 5.8 gram salt per liter.

The pressure on the internal solution was 10 p.s.i.g., the superficial velocity was 5.8 centimeters per second, and the flow rate of the flushing solution was 360 milliliters per minute. The outer diameter of the cylindrical membrane was 2.5 centimeters and its length 12.6 centimeters. The initial volume flux through the membrane was 2 milliliters per hour. An electric current of gradually increasing magnitude was passed from the outside to the inside of the membrane. This backwash decreased the reverse-osmosis flow to 0.54 milliliters per hour when the current was 100 milliamperes. The current was then raised to 200 milliamperes for several minutes and then reduced to 100 milliamperes. The resulting strong backwash caused an increase in flux to 2.8 milliliters per hour.

I claim:

1. A process for improving the efficiency of a reverse osmosis process for purification of saline water, said reverse osmosis process consisting essentially of applying to said saline water a pressure in excess of the osmotic pressure of the saline water, said saline water being separated from purified product water by a reverse osmosis membrane whereby pure water is caused to permeate through said membrane while salt molecules are retained by the membrane, comprising backwashing the membrane by application of an electric potential across the membrane to cause an electroosmotic backflow of water through the membrane.

2. The process of claim 1 in which the reverse osmosis membrane is a cellulose acetate membrane.

3. The process of claim 1 in which the backwashing is further enhanced by application of a flushing solution to the low-pressure side of the membrane.

* * * * *